United States Patent
Lecrone et al.

(10) Patent No.: US 6,986,009 B1
(45) Date of Patent: *Jan. 10, 2006

(54) INTERCEPTING CONTROL OF A HOST I/O PROCESS

(75) Inventors: Douglas E. Lecrone, Hopkinton, MA (US); Gary H. Cox, Franklin, MA (US); Dan Aharoni, Brookline, MA (US); Brett A. Quinn, Lincoln, RI (US)

(73) Assignee: EMC Corporation, Hopkinton, MA (US)

( * ) Notice: Subject to any disclaimer, the term of this patent is extended or adjusted under 35 U.S.C. 154(b) by 254 days.

This patent is subject to a terminal disclaimer.

(21) Appl. No.: 10/600,133

(22) Filed: Jun. 20, 2003

Related U.S. Application Data

(63) Continuation of application No. 10/283,976, filed on Oct. 30, 2002.

(51) Int. Cl.
*G06F 12/00* (2006.01)
(52) U.S. Cl. .................. 711/162; 711/161; 707/204
(58) Field of Classification Search ........ 711/161–162; 714/1–7; 707/200–204
See application file for complete search history.

(56) References Cited

U.S. PATENT DOCUMENTS

| | | | |
|---|---|---|---|
| 5,574,950 A | 11/1996 | Hathorn et al. | 710/8 |
| 5,584,039 A | 12/1996 | Johnson et al. | 710/6 |
| 5,680,580 A | 10/1997 | Beardsley et al. | 714/6 |
| 6,145,066 A | 11/2000 | Atkin | 711/165 |
| 6,233,660 B1 | 5/2001 | Vishlitzky | 711/154 |
| 6,308,284 B1 | 10/2001 | LeCrone et al. | 714/6 |
| 6,526,487 B2 * | 2/2003 | Ohran et al. | 711/162 |
| 6,574,709 B1 | 6/2003 | Skazinski et al. | 711/119 |
| 6,735,636 B1 | 5/2004 | Mokryn et al. | 710/5 |
| 2002/0049925 A1 | 4/2002 | Galipeau et al. | 714/6 |

* cited by examiner

*Primary Examiner*—Nasser Moazzami

(74) *Attorney, Agent, or Firm*—Fish & Richardson P.C.

(57) ABSTRACT

A data-mirroring method in which, while an I/O process is processing a first I/O request for writing data to a first device, control is obtained from that I/O process executing on a host computer. A second I/O request, this one for writing the data to the second device, is then created. Then, control is returned to the I/O process by causing the first I/O request to be made available to a first data storage system managing the first device.

18 Claims, 16 Drawing Sheets

INTERCEPTING CONTROL OF A HOST I/O PROCESS

This application is a continuation application of U.S. Ser. No. 10/283,976, filed Oct. 30, 2002.

FIELD OF INVENTION

This invention relates to disaster recovery in data storage systems, and in particular, to data mirroring.

BACKGROUND

The sudden and unforeseen destruction of a data storage facility can result in significant business interruption. In some cases, the extent of the interruption, when accompanied by data loss, can even threaten the existence of the business.

A known method of reducing the risk of such interruption is to periodically copy data from the data storage facility to a mirror location, either over a suitable transmission line or by physically transporting tapes or other media. A disadvantage of this solution is that the data may change in the interval between copy operations. If the facility is destroyed during this vulnerable interval, data loss may occur.

Data mirroring reduces the extent of this vulnerable interval to essentially zero. In a known mirroring system, a primary storage subsystem communicates with: a host, primary storage devices, and a mirror storage subsystem that manages mirror storage devices. When the host requests that data be saved, the primary storage subsystem causes that data to be written to a primary storage device. In addition, the primary storage subsystem sends a message to the mirror storage subsystem requesting that this data be written to a designated mirror device. Only when both these write operations have successfully completed does the primary storage subsystem send a message to the host confirming completion of the write operation.

The price of this security is latency. For each write operation, the host endures latency associated with: establishing a connection between itself and the primary storage subsystem, establishing a connection between the primary and mirror storage systems, and overhead associated with the mirroring software itself.

SUMMARY

In one aspect, the invention includes a data-mirroring method in which, while an I/O process is processing a first I/O request for writing data to a first device, control is obtained from that I/O process executing on a host computer. A second I/O request, this one for writing the data to the second device, is then created. Then, control is returned to the I/O process by causing the first I/O request to be made available to a first data storage system managing the first device.

One practice of the invention includes determining that the first device is being mirrored by a second device.

Another practice of the invention includes detecting that the first I/O request has been made available to the first data storage system and, in response, causing the second I/O request to be provided to a mirror data storage system managing the second device. Detecting that the first I/O request has been made available in this way can include intercepting a response indicating a status of the first I/O request. One way to intercept a response includes intercepting a condition code indicative of a status of the first I/O request, for example by intercepting a return from an IOS-VCP module to an IOSVSSCH module.

In one practice of the invention, obtaining control from an I/O process includes identifying a forward pointer to instructions to be executed by the I/O process in processing the first I/O request. This forward pointer is then made to point to a front-end detour that includes instructions for, creating the second I/O request.

In another practice of the invention, control is obtained by intercepting a call by an IOSVSSCH module to a DDTSIO module. This can be achieved by, for example, identifying a forward pointer that points to instructions for executing a DDTSIO module and then causing the forward pointer to point to instructions for executing a front-end detour. The front-end detour includes instructions for creating the second I/O request.

Another practice of the invention includes obtaining control from the I/O process after the first I/O request has been made available to a first data storage system managing the first device. Then, information indicative of a status of the first I/O request is obtained.

Alternatively, the invention can include identifying a return pointer to a module that is intended to receive information indicative of a status of the first I/O request and causing the return pointer to point to a back-end detour. The back-end detour includes instructions for causing the second I/O request to be provided to a second data storage system managing the second device.

Causing the second I/O request to be provided to a second data storage system can include determining whether issuing a request to start an I/O operation is permissible, and if so, starting the second I/O operation. If such a request is not permissible, the second I/O request is scheduled for starting at a later time.

Another practice of the invention includes determining whether both the first I/O request and the second I/O request are both complete. If both are complete, confirmation of the first I/O request's completion is permitted. Otherwise, such confirmation is prevented. Determining whether both first and second I/O requests are complete can include intercepting information indicative of status of an I/O request. Such interception can include identifying a status pointer to instructions to be executed by an I/O process in response to the information indicative of status of the I/O request and causing that status pointer to point to a post-status detour. The post-status detour includes instructions for determining whether both the first I/O request and the second I/O request are both complete; and if both the first I/O request and the second I/O request are both complete, permitting confirmation of completion of the first I/O request; and if the second I/O request is incomplete, preventing confirmation of completion of the first I/O request.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These and other features and advantages of the invention will be apparent from the following detailed description and the accompanying figures, in which:

DETAILED DESCRIPTION

Figure 1:
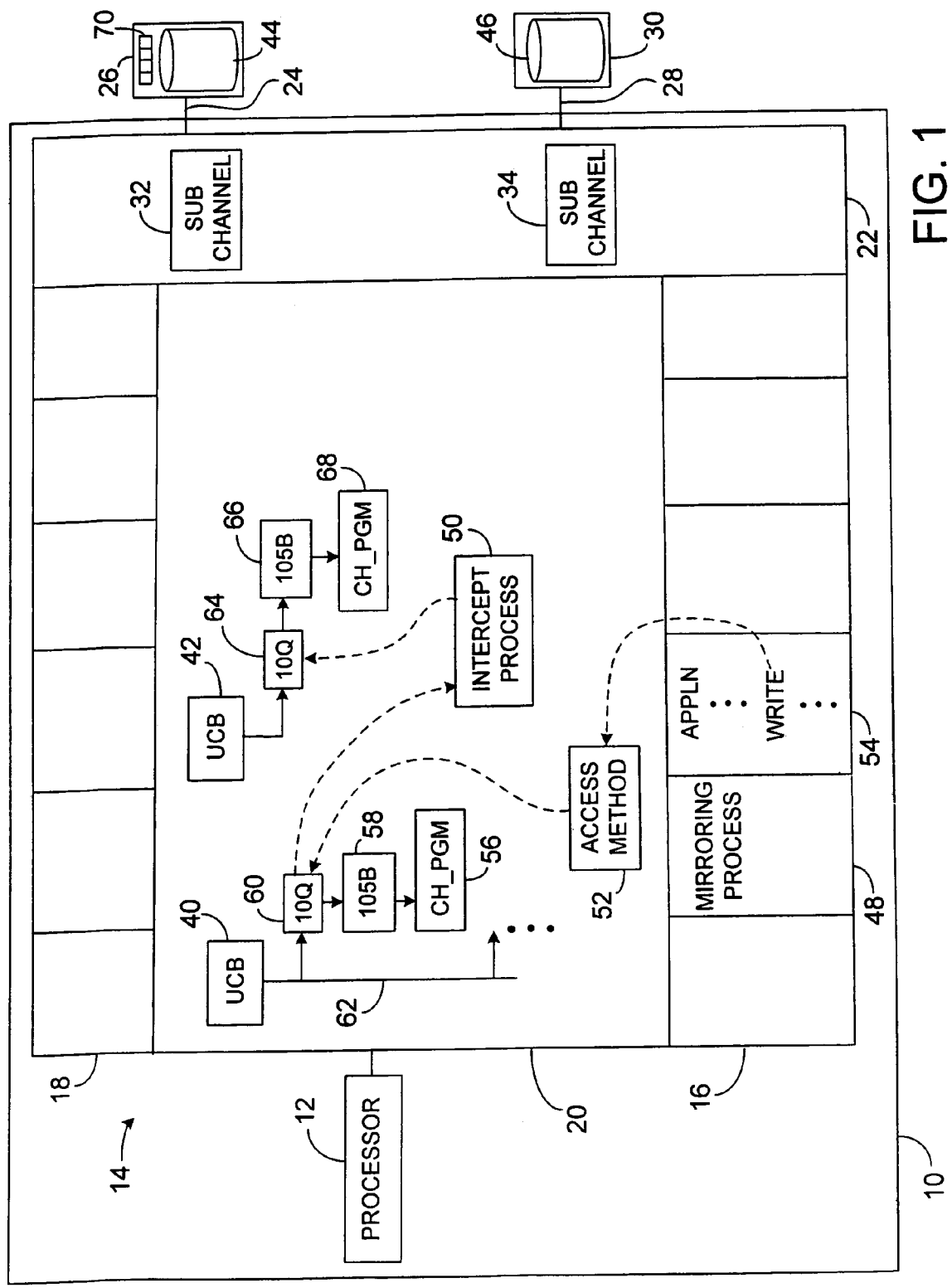
FIG. 1 is a system incorporating the invention.

FIG. 1 shows a host computer 10 having a main processor 12 for executing application processes and a main memory 14 in which to execute those processes. The main memory 14 is partitioned into a private memory area 16 and an extended private memory area 18, both of which are reserved for use by processes currently being executed, and a common memory area 20, which is used to execute system utilities available to applications executing in the private memory 16.

To relieve the main processor 12 of the details of managing I/O to peripheral devices, it is known to provide a channel subsystem 22 in communication with the main processor 12 and having access to the main memory 14. Primary and mirror data links 24, 28 provide communication paths between the host computer 10 and primary and mirror storage subsystems 26, 30 respectively. The channel subsystem 22 directs the flow of data between the primary and mirror storage subsystems 26, 30 and the main memory 14. Within the channel subsystem 22, each of the primary and mirror storage subsystems 26, 30 is associated with corresponding primary and mirror sub-channels 32, 34.

In response to instructions received from the primary subchannel 32, the primary storage subsystem 26 performs such functions as reporting its status, writing to a primary device 44 under its control, or reading from the primary device 44. Similarly, in response to instructions received from the mirror subchannel 34, the mirror storage subsystem 30 performs such functions as writing to a mirror device 46 under its control, reading from the mirror device 46, or reporting its status. These instructions from the primary and mirror subchannels 32, 34 take the form of an ordered sequence of channel command words ("CCW") referred to as a "channel program" or "chain".

Figure 2:
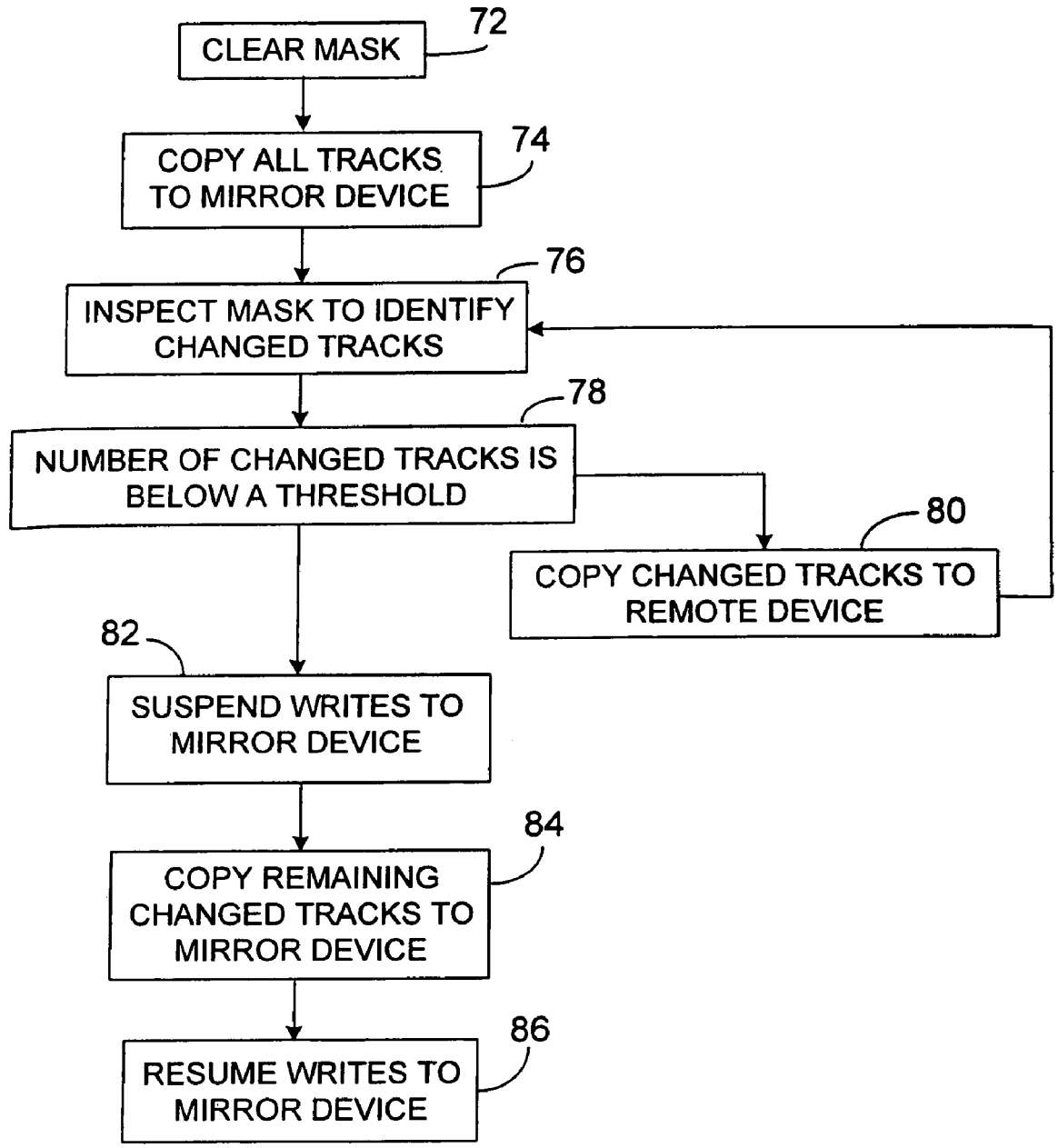
FIG. 2 is a flow-chart of a synchronization method.

Before mirroring begins, it is preferable that the primary device 44 and the mirror device 46 be storing identical data. The process of ensuring that this is so is referred to as "synchronization." A mirror process 48 executing in the private memory area 16 synchronizes the content of the primary and mirror devices 44, 46 according to a procedure described below in connection with FIG. 2.

The details of synchronization depend on the particular primary storage subsystem 26 in use. However, when the primary storage subsystem 26 is a Symmetrix system manufactured by EMC Corporation of Hopkinton, Mass., a mask 70 maintained therein has a mask bit for each track on the primary device 44. As part of changing a track on the primary device 44, the primary storage subsystem 26 sets the mask bit that corresponds to that track.

Synchronization begins with the clearing of this mask 70 (step 72) and the copying of all tracks on the primary device 44 to the mirror device 46 (step 74). During this copying step, applications 54 continue to write to the primary device 44. This causes the primary storage subsystem 26 to set the mask bits corresponding to those tracks that change during the copying step. At the completion of the copying step, the mask 70 is inspected (step 76) to see how many mask bits are set, and hence how many tracks changed during the copying step. If the number of changed tracks is above a threshold (step 78) then tracks associated with those set mask bits are re-copied to the mirror device 46 in a second copying step, during which applications 54 can again write to the primary device (step 80). Following this second copying step, the mask 70 is again inspected (step 76) to identify tracks that may have changed during the second copying step.

With each additional copying step, the time required to copy all the changed tracks tends to decrease. As a result, the number of tracks that change during a copying step is also likely to decrease. Additional copying steps continue until the number of changed tracks falls below a selected threshold. When this point is reached, additional writes to the primary device 44 are briefly suspended (step 82). The remaining changed tracks are copied to the mirror device 46 in one final copying step (step 84), during which no further writes can occur. Once this final copying step is complete, the primary and mirror devices 44, 46 are identical. The mirror process 48 then unsuspends writes to the primary device 44 (step 86).

As used herein, an I/O request refers to request to read from, write to, and/or change the status of a particular device, referred to as the target device for the I/O request. When the target device is a primary device, the I/O request will be referred to as a "primary I/O request." Conversely, when the target device is a mirror device, the I/O request will be referred to as a "mirror I/O."

When a host application 54 wishes to perform any I/O involving the primary device 44, it first communicates with an access method 52. In response to the communication from the host application 54, the access method 52 creates a primary I/O request that includes: a primary chain 56; a primary I/O supervisor block ("IOSB") 58 having pointers to information specific to the I/O request, including, among others, a pointer to the primary chain 56.

Figure 3:
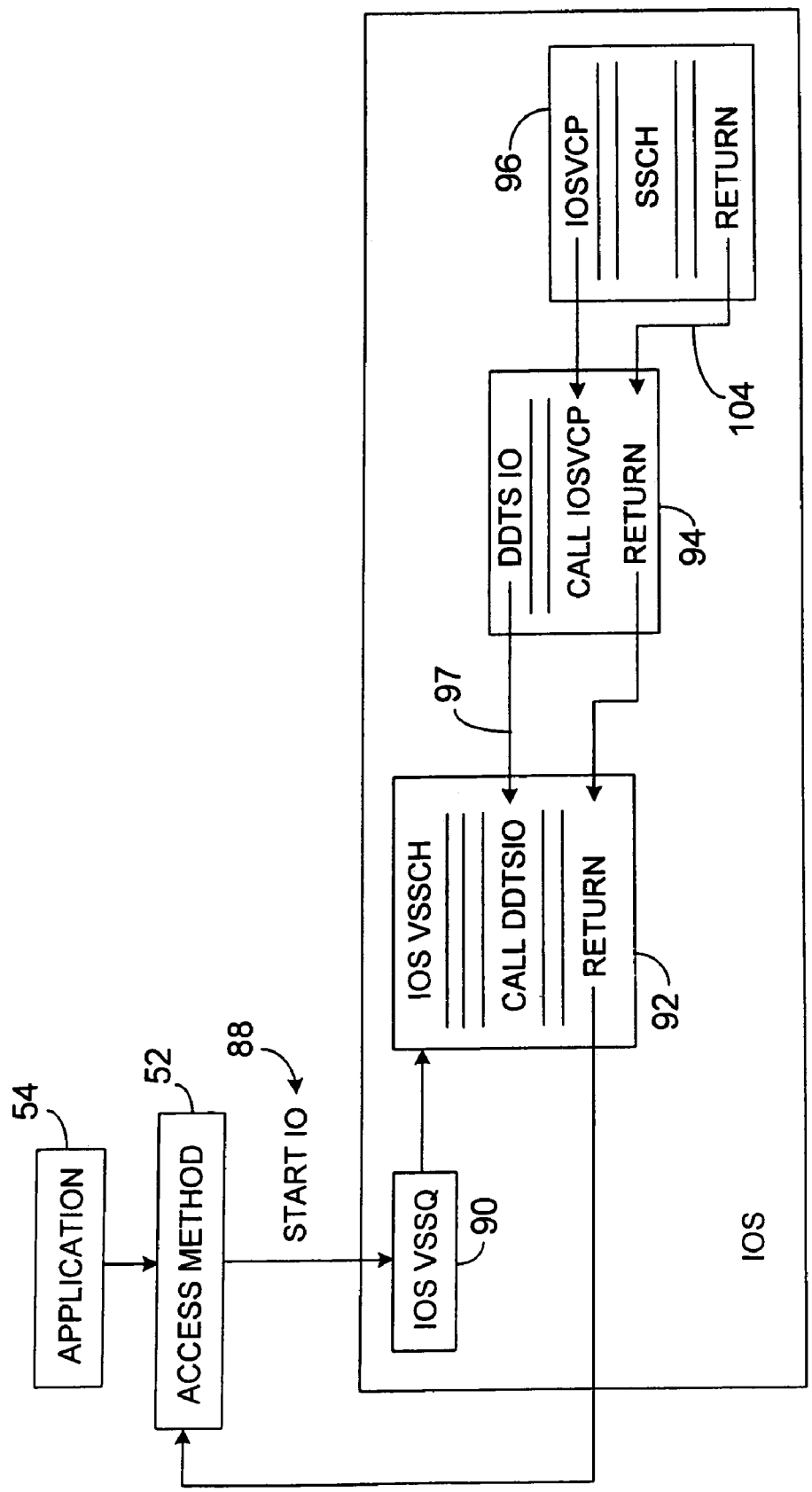
FIGS. 3 and 14 shows control flow in a conventional I/O processing system.

Referring now to FIG. 3, the access method 52 then issues a primary STARTIO command (step 88) to the IOS ("I/O Supervisor"). In response, the built-in IOSVSSCQ module detects the primary STARTIO command (step 90) and causes a primary queue entry ("IOQ") 60 to be created. The IOSVSSCQ module then calls the IOSVSSCH module (step 92). The IOSVSSCH module then causes the primary queue entry 60 to be added to a primary queue 62 maintained by the primary unit control block 40.

In the course of execution, the IOSVSSCH module calls a device-dependent DDTSIO module appropriate to the particular I/O request (step 94). In a conventional system, a first pointer 97 points to the address of the appropriate DDTSIO module.

The DDTSIO module is intended to retrieve the primary chain 56 and to modify it as necessary for the primary device 44. Normally, the DDTSIO module calls the IOSVSCP module 96, which is what finally issues the primary SSCH ("start sub-channel") command that causes the primary chain 56 to be sent to the primary storage subsystem 26.

Figure 4:
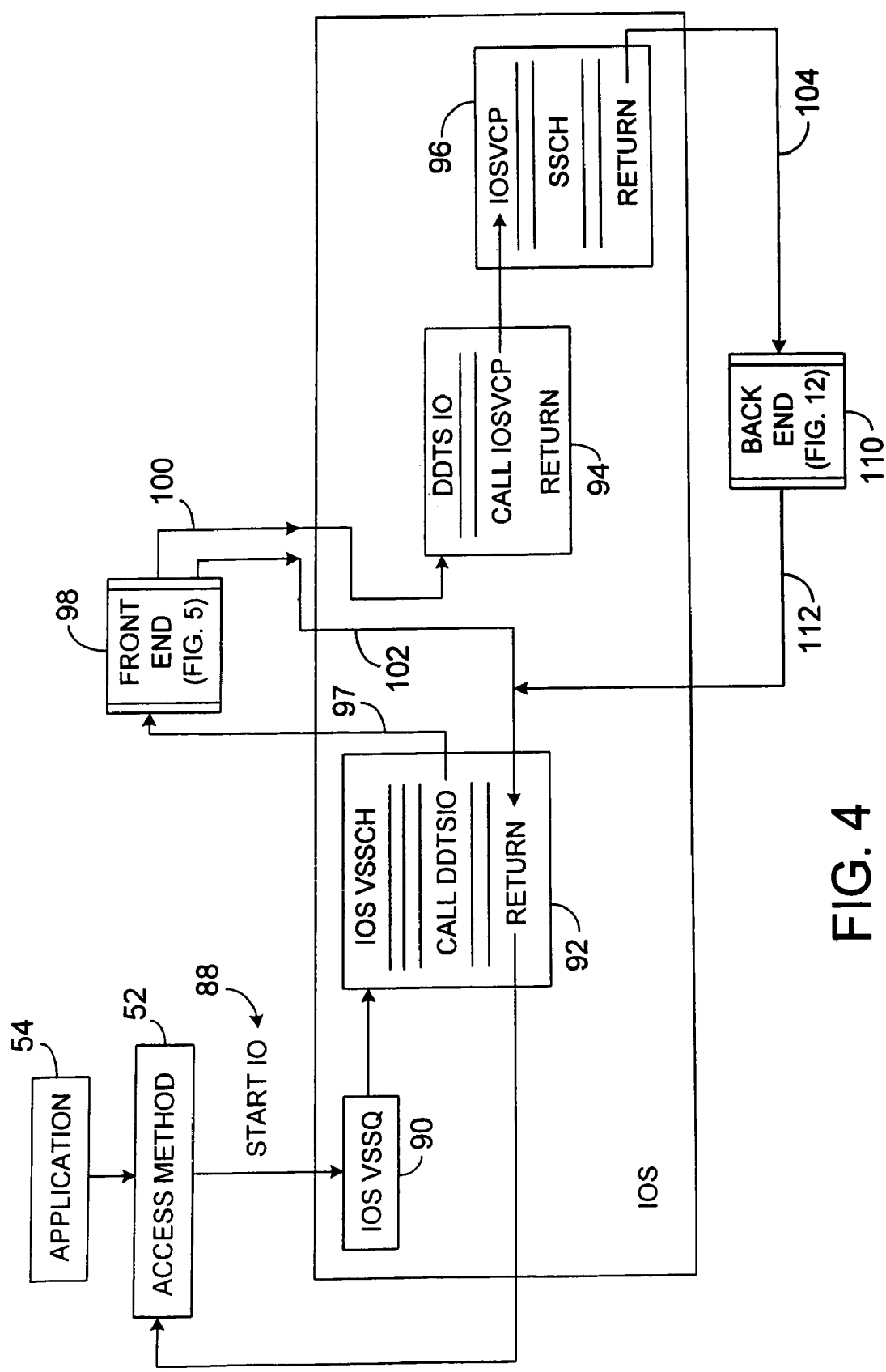
FIGS. 4 and 15 shows control flow in an I/O system incorporating the mirroring method of the invention.

In the course of initializing the system, the first pointer 97 that, in conventional IOS processing would point to the DDTSIO module, is pointed instead to a portion of an intercept process 50 referred to herein as the "front-end detour" 98. This causes the IOS to execute instructions from the front-end detour 98, as shown in FIG. 4, instead of from the DDTSIO module, as shown in FIG. 3. The initialization described above affects all I/O requests, whether they are made during the synchronization process described in FIG. 2, or as part of a mirroring operation.

Figure 5:
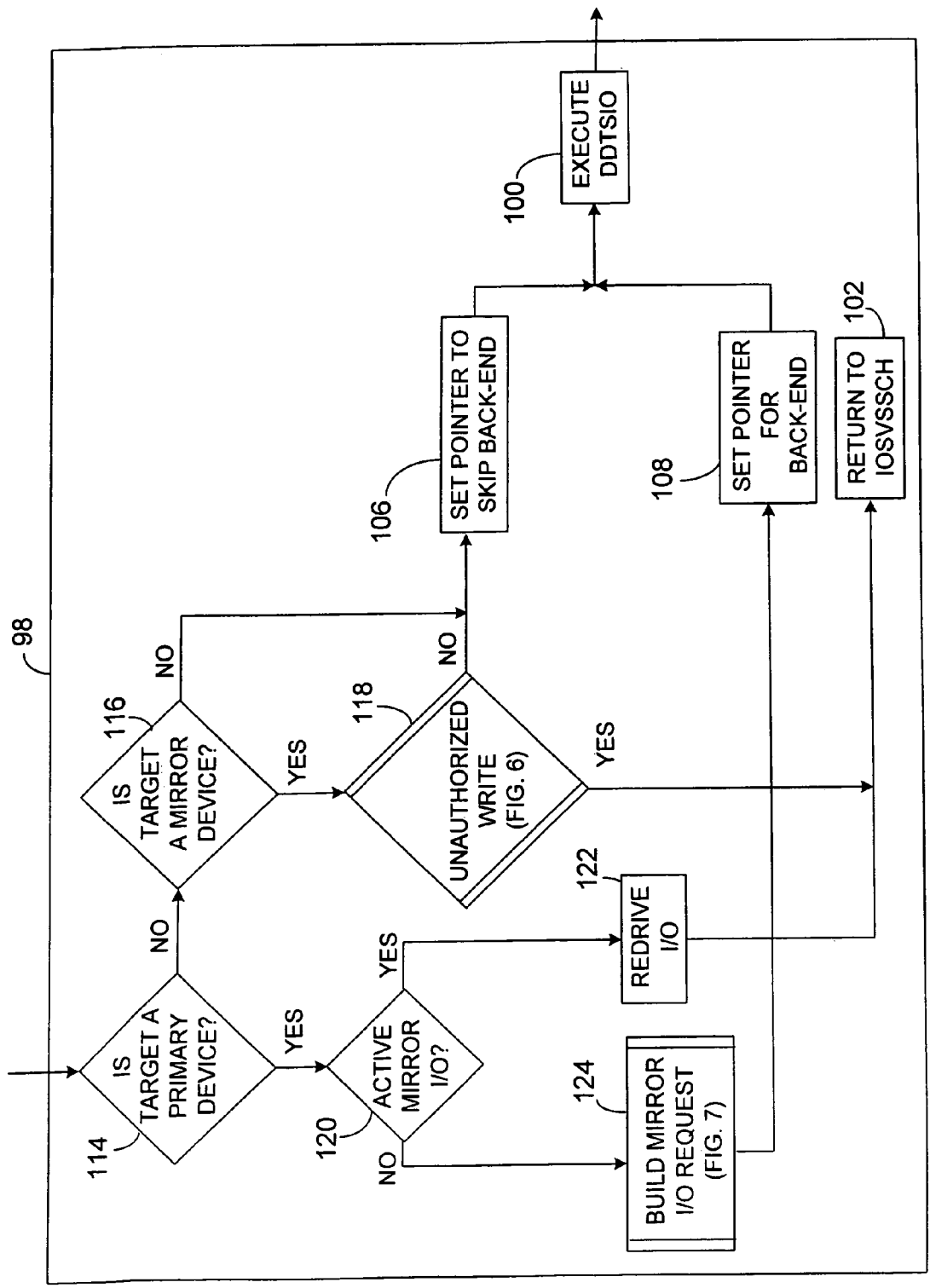
FIGS. 5–11 are flow-charts of the front-end detour shown in FIG. 4.

The front-end detour 98 ends with instructions, shown in FIG. 5, to either execute the DDTSIO module that the first pointer 97 originally pointed to (step 100) or to return control to the IOSVSSCH module (step 102). In either case, the front-end detour 98 permits the IOS to proceed in the conventional manner.

As part of a conventional I/O request shown in FIG. 3, the IOSVSCP module returns, to the IOSVSSCH module, a condition code that indicates whether the SSCH command initiated successfully (step 104). In normal operation, the IOSVSCP module returns the condition code, by way of the DDTSIO module, to the IOSVSSCH module. The IOSVSCP module does so by executing instructions pointed to by a return address.

In the case of a write to a primary device 44, the condition code is of particular interest because it determines whether or not there should be a corresponding write to the mirror device 46. A failed primary SSCH command, for example, should result in no mirroring operation. To intercept this condition code, the front-end detour 98 includes instructions (steps 106, 108) for optionally causing the return address to point to another portion of the intercept process 50, referred to herein as the "back-end detour 110," as shown in FIGS. 4 and 5.

The back-end detour 110 performs selected tasks on the basis of the outcome of an SSCH command. Like the front-end detour 98, the back-end detour 110 ends with an instruction to allow resumption of conventional I/O processing. In particular, the back-end detour 110 ends with an instruction to return to the IOSVSSCH module (step 112).

As noted above, the foregoing initialization affects every I/O request. However, not all target devices are primary devices 44. Certain devices, for example are mirror devices 46 that should be written only when a corresponding primary device 44 is also written to. Other storage devices are neither primary devices 44 nor mirror devices 46. Such devices need not be mirrored at all. Accordingly, the front-end detour 98 includes instructions, shown in FIG. 5, for determining whether the target device of an I/O request is a primary device (step 114), a mirror device (step 116), or neither.

If the target device is a mirror device 46, the front-end detour 98 determines whether the I/O request is attempting an unauthorized write (step 118). If so, the front-end detour 98 rejects the I/O request and returns control to the IOSVSSCH module (step 102). Otherwise, the front-end detour 98 sets a second pointer to bypass the back-end detour 110 (step 106) and yields control to the DDTSIO module (step 100). The details of this procedure are discussed below in connection with FIG. 6.

If the target device is neither a primary device 44 nor a mirror device 46, then the front-end detour 98 sets the second pointer to bypass the back-end detour 110 (step 106) and yields control to the DDTSIO module (step 100).

The remaining case is that in which the target device is a primary device 44 (step 114). In certain cases, a pending I/O request for the mirror device 46 remains active. This possibility arises because an I/O request for the primary device 42 can be re-driven. Accordingly, the front-end detour 98 first determines whether or not a mirror I/O request is still active (step 120). If so, the front-end detour 98 sets the return code to "4", thereby leaving the pending I/O request on the queue to be retried later (step 122), and returns to the IOSVSSCH module (step 102).

If no pending I/O request is active, the front-end detour 98 creates a mirror I/O request corresponding to the primary I/O request (step 124). The mirror I/O request includes: a mirror chain 68; a mirror IOSB 66; and a mirror IOQ 64 containing a pointer to the mirror IOSB 66. The details of creating the mirror I/O request are discussed below in connection with FIG. 7.

Because the SSCH command for the primary I/O request may fail, a corresponding mirror I/O request is postponed until the intercept process 50 learns whether the primary SSCH command has either executed successfully or failed. Only when it learns that the primary SSCH command executed successfully does the intercept process 50, initiate the sequence of commands that ultimately moves the mirror I/O request from a shadow queue, in which it has been temporarily held, to a mirror queue 64 associated with the mirror unit control block 42. The intercept process 50 does this by executing instructions from the back-end detour 110.

Figure 6:
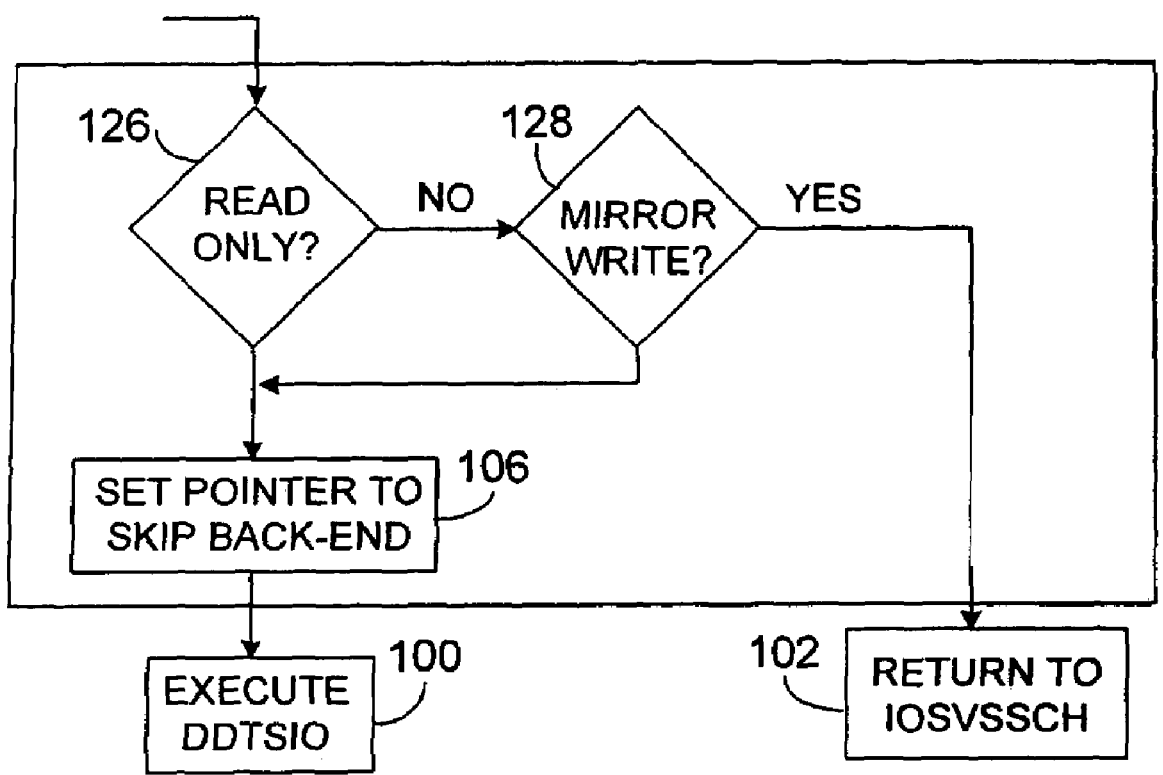

If the target device turns out to be a mirror device 46, the front-end detour 98 determines whether the primary I/O request attempts an unauthorized write (step 118). Referring to FIG. 6, the front-end detour 98 first determines whether the I/O request is merely a request to read data (step 126). If so, the front-end detour 98 yields control to the DDTSIO module as discussed above (steps 106, 100).

As noted above, the change to the first pointer 97 affects every I/O request, including those I/O requests that are in fact mirror I/O requests made by the back-end detour 110. If the I/O request is a mirror I/O request (step 128), the front-end detour 98 yields control to the DDTSIO module as discussed above (steps 106, 100).

A write request other than one made by the back-end detour 110 indicates an interloper attempting an improper write to the mirror device 46. In the illustrated embodiment, such I/O requests are rejected (step 130) by setting IOSCOD=4A. Alternatively, such I/O requests are rejected by setting a defined extent or a mask to prevent a write to the mirror device 46. The front-end detour 98 then sets a return code ("RC") to "8" and returns control to the IOSVSSCH module, bypassing the back-end detour 110 (step 102).

Figure 7:
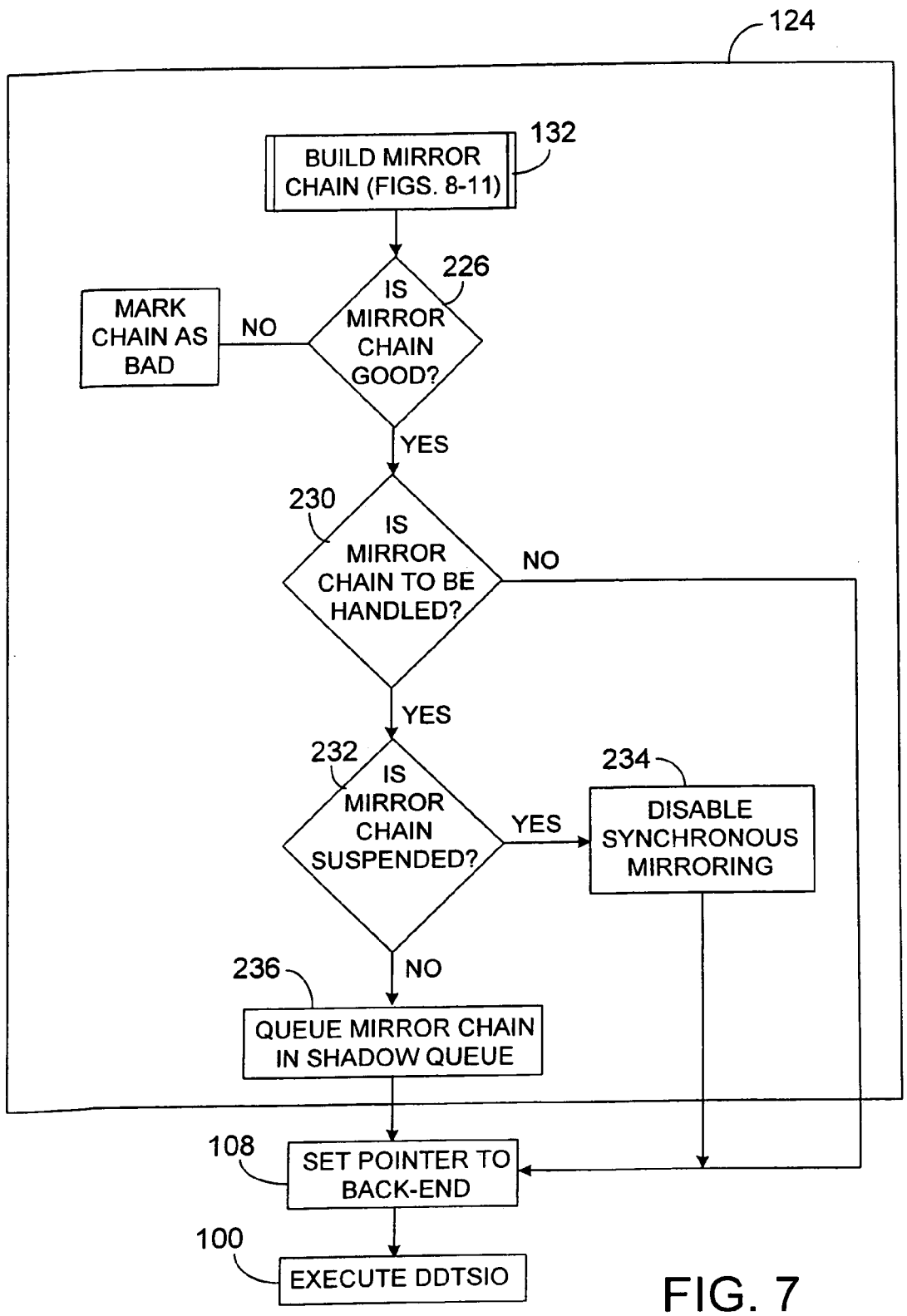

FIG. 7 shows the procedure carried out by the front-end detour 98 in creating the mirror I/O request (step 124). Upon beginning the procedure shown in FIG. 7, the front-end detour 98 only knows that an I/O request has, as its target device, a primary device. It does not know whether the I/O request is a read, a write, or a combination of the two. The front-end detour 98 determines which of these three possibilities is the case and, if necessary, creates the mirror chain 68 to be provided to the mirror storage subsystem 30 (step 132). The detailed steps for performing these tasks are discussed below in connection with FIGS. 8–11.

Figure 8A:
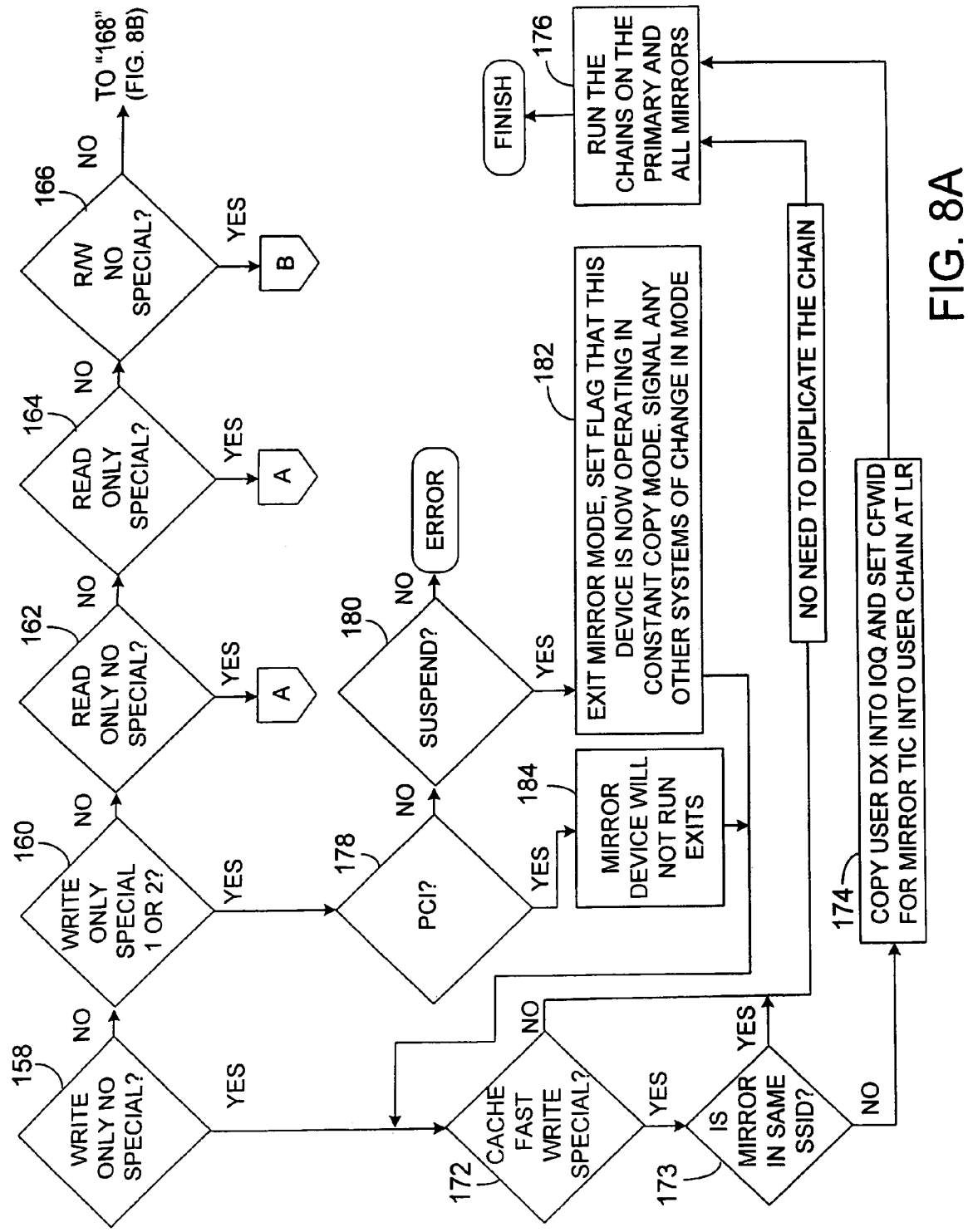
Figure 8:
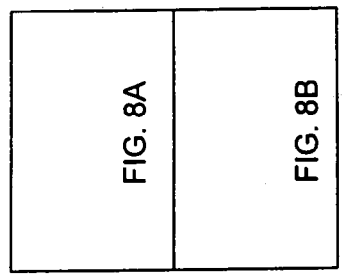
Figure 8B:
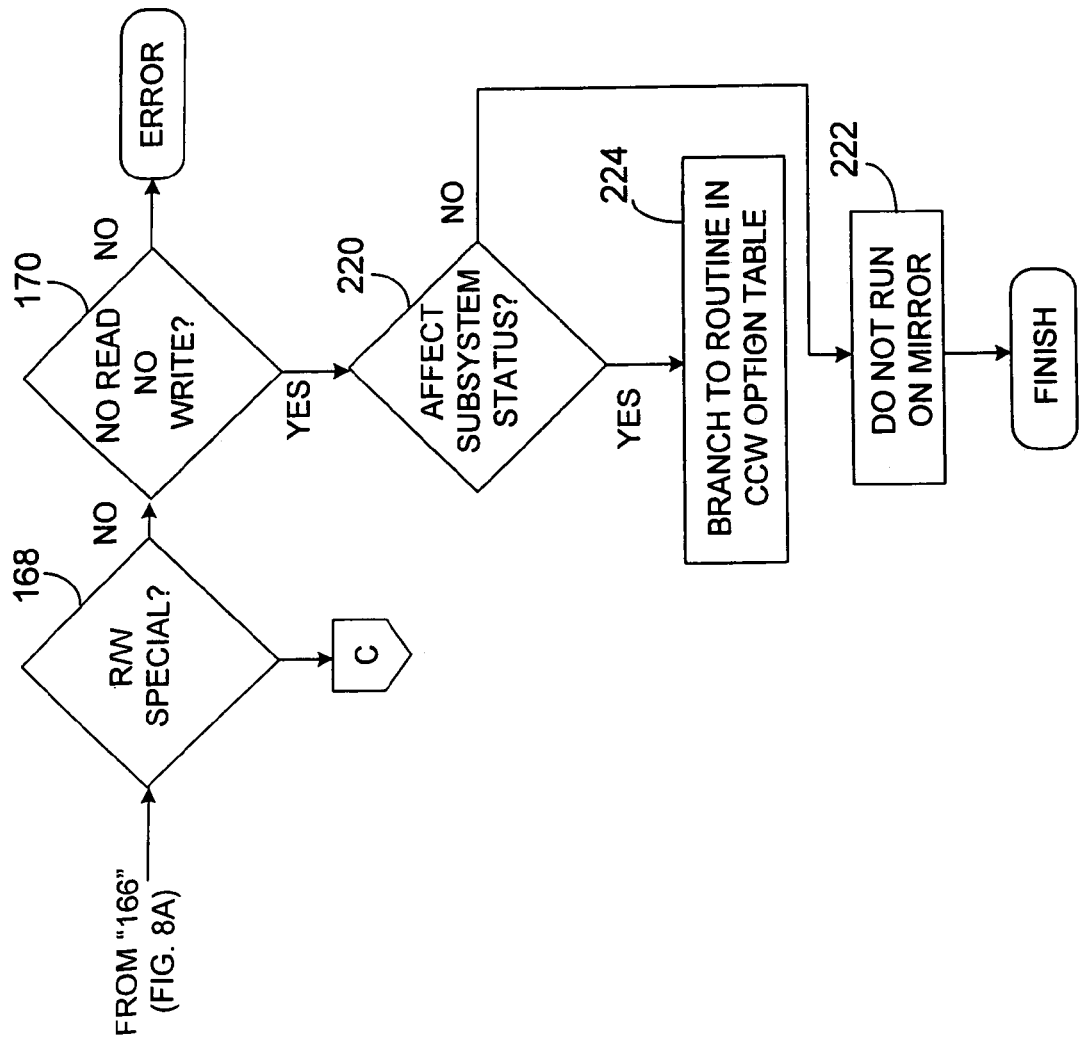

The front-end detour 98 classifies the primary chain 56 into one of seven categories shown at the top of FIG. 8. In particular, it classifies the primary chain 56 as being either one that writes to a primary device 44 (steps 158, 160), one that reads from a primary device 44 (steps 162, 164), one that both reads from and writes to a primary device 44 (steps 166, 168), or one that does neither (step 170). For each of those cases, the front-end detour 98 also determines whether the primary chain 56 has "special features" associated with it (steps 160, 164, 168) or whether it does not (steps 158, 162, 166). Examples of special features associated with a primary chain 56 include whether the primary chain 56 is self-modifying, whether the primary chain 56 includes an instruction to suspend its own execution, and whether a PCI ("Program Controlled Interrupt") indicator is set.

If a primary chain 56 only executes a write to the primary device 44, and no special features are associated with the primary chain 56 (step 158), then the front-end detour 98 determines whether a cache fast write ("CFW") bit is set in a channel control word (step 172). If the CFW bit is not set, then there is no need to duplicate the primary chain 56. In this case, the mirror chain 68 will be the same chain as the primary chain 56 (step 176).

If the CFW bit is set (step 172), then the front-end detour 98 first determines whether a CFWID ("Cache Fast Write ID)" associated with the mirror storage subsystem 30 and a CFWID associated with the primary storage subsystem 26 have the same value (step 173). If they do, then there is no need to create a separate mirror chain 68 In this case, the primary chain 56 is simply provided to the primary storage subsystem 26 (step 176). Otherwise, the front-end detour 98 causes the primary chain 56 to be duplicated. It does so by copying the defined extent ("DX") into the I/O queue and setting the CFWID (step 174). The resulting duplicate of the primary chain 56 is the mirror chain 68 that is placed in the shadow queue while the primary chain 56 is provided to the primary storage subsystem (step 176).

If a primary chain 56 executes only a write to the primary device 44 but a special feature is associated with the primary chain 56 (step 160), then the front-end detour 98 identifies the special feature. In particular, the front-end detour 98 determines whether PCI is set (step 178) or whether the primary chain 56 includes an instruction to suspend its own execution (step 180).

If the primary chain 56 includes an instruction to suspend its own execution (step 180), then the front-end detour 98 sets a mirror-mode flag to indicate that the primary device is now operating in "constant copy" mode (step 182). When operating in constant copy mode, synchronous mirroring is disabled. Instead, the application 54 receives a write confirmation upon successful completion of the primary I/O request. Meanwhile, a corresponding mirror I/O request is queued for writing to the mirror device 46 as soon as possible.

If PCI is set (step 178), then the front-end detour 98 avoids causing the data to be written to the mirror device 46 at all (step 184).

If a primary chain 56 only contains instructions to read from the primary device 44, then the same procedure is run regardless of whether or not the primary chain 56 has any special features associated with it (steps 162, 164). This procedure is summarized in FIG. 9.

Figure 9:
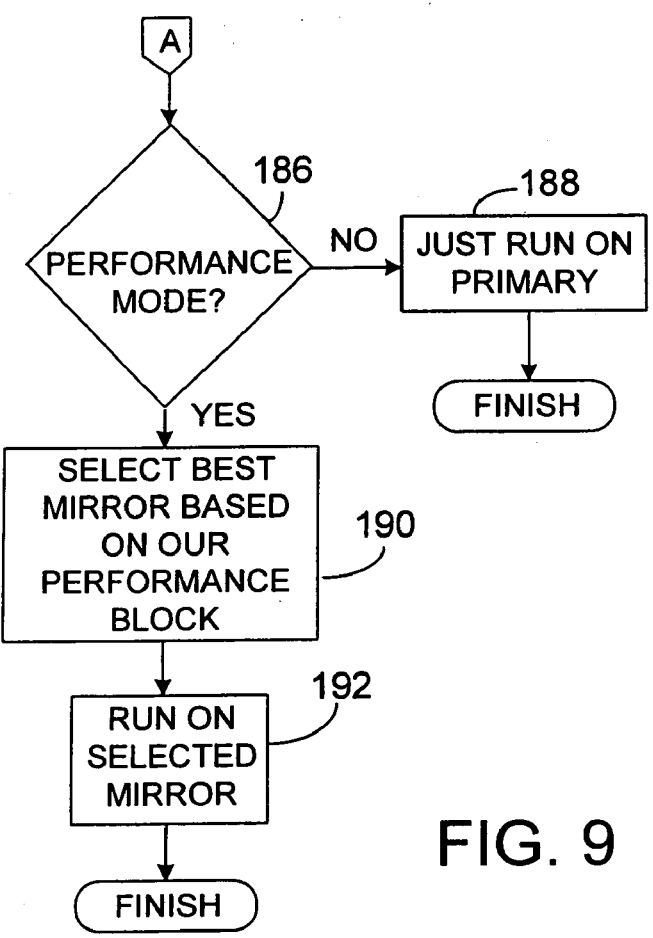

Referring now to FIG. 9, the front-end detour 98 first determines if the host computer 10 is configured to select, on the basis of dynamically maintained performance metrics, from which of the primary and mirror devices 44, 46 to read the desired data (step 186). If the host computer 10 is not thus configured, then the desired data is read from the primary device 44 (step 188). In this case, the front-end detour 98 need not create a mirror chain 68. Otherwise, the device 44, 46 from which data will be read is selected on the basis of the performance metrics (step 190) and the primary chain 56 is then queued for transmission only to the selected storage subsystem 26, 30 (step 192).

Figure 10:
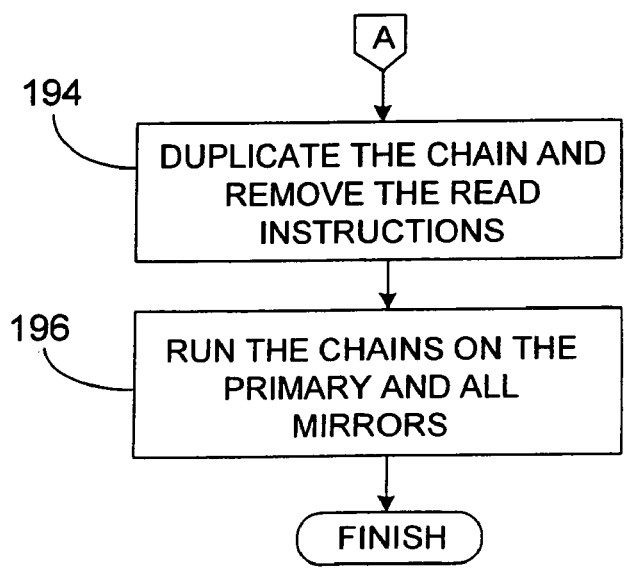
Figure 11:
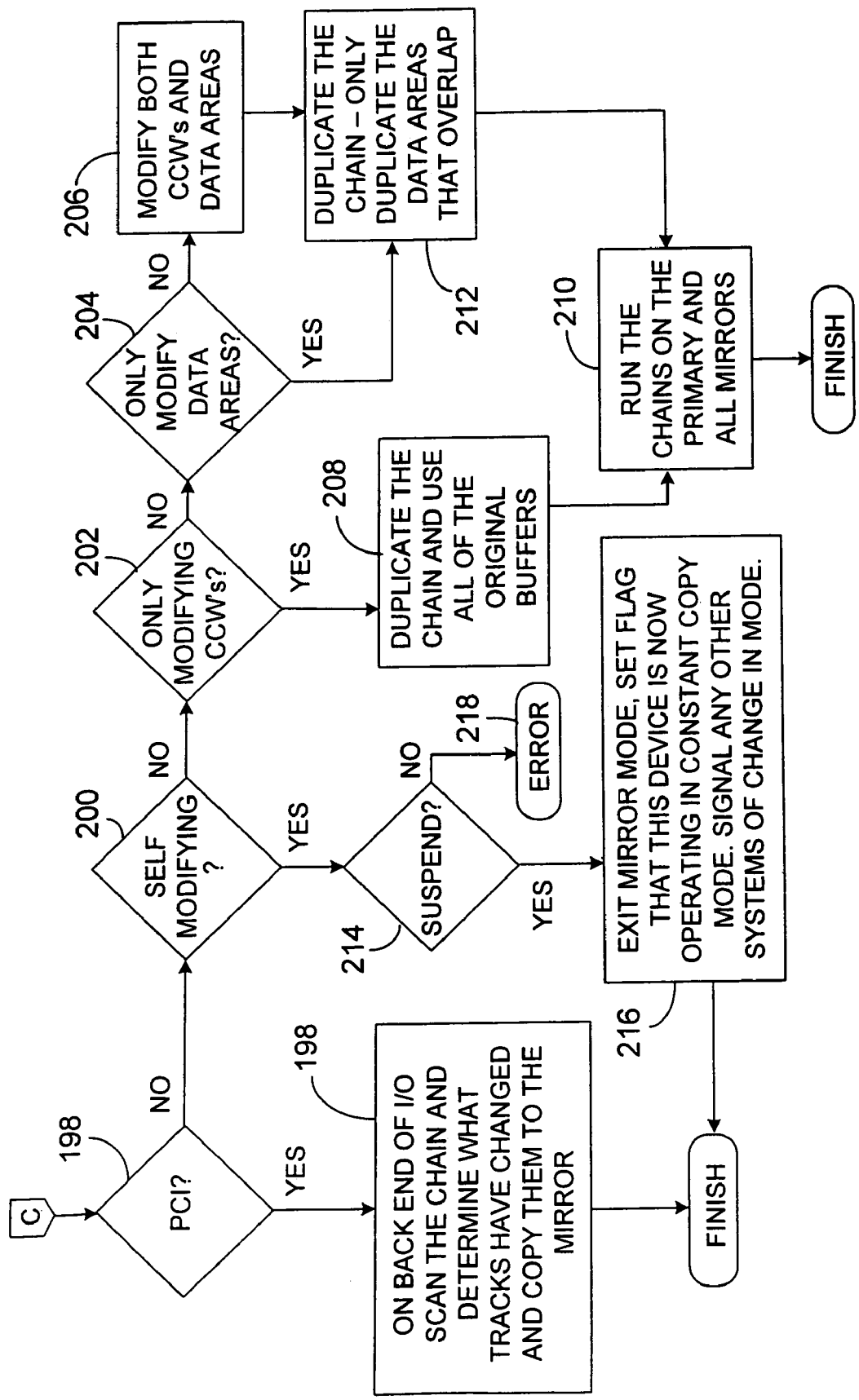

If the primary chain 56 contains both read and write instructions (steps 166, 168), then the front-end detour 98 carries out the procedure shown in either FIG. 10 or FIG. 11, depending on whether or not any special features are associated with the primary chain 56.

Referring now to FIG. 10, if no special features are associated with the writing of data (step 166), then the primary chain 56 is duplicated to create the mirror chain 68 (step 194). However, to avoid unnecessarily reading data from both the primary and mirror devices 44, 46, the mirror chain 68 is prevented from reading. One way to prevent the mirror chain 68 from reading is to remove all its read instructions. This ensures that data is read only from the primary device 44.

If the primary chain 56 is intended to both read from and write to the primary device 44, and if the primary chain 56 also has special features associated with it (step 168), then the front-end detour 98 carries out the procedure summarized in FIG. 11.

Referring to FIG. 11, the front-end detour 98 determines whether a PCI indicator is set (step 198). If so, the primary chain 56 is scanned to determine what tracks have changed. Only those tracks that have changed are ultimately copied to the mirror device 46 (step 199).

If the PCI is not set, the front-end detour 98 determines whether the primary chain 56 is a self-modifying chain (step 200). If so, the front-end detour 98 determines whether the primary chain 56 is intended to modify only its channel control words (step 202), only its data areas (step 204), or both its channel control words and its data areas (step 206).

If only channel control words of the primary chain 56 are to be modified, then no data areas will change. Hence, the front-end detour 98 only duplicates the primary chain 56 and not the data areas (step 208). The resulting mirror chain 68 is placed in the shadow queue, while the primary chain 56 is provided to the primary storage subsystem 26 (step 210).

If only data areas of the primary chain 56 are to be modified (step 202), the primary chain 56 is duplicated. However, data areas are duplicated only to the extent that they overlap (step 212). The resulting mirror chain 68 is placed in the shadow queue for later processing by the back-end detour 110; the primary chain 56, meanwhile, is provided to the primary storage subsystem 26 (step 210).

If both the channel control words and the data areas are to be modified (step 206), then the primary chain 56 is duplicated and data areas are duplicated only to the extent they overlap (step 212). The resulting mirror chain 68 is placed in the shadow queue, while the primary chain 56 is provided to the primary storage subsystem 26 (step 210).

If the primary chain 56 is not a self-modifying chain (step 202), the front-end detour 98 checks to see if the primary chain 56 includes an instruction to suspend its own execution (step 214). If so, then the front-end detour 98 sets the mirror-mode flag to indicate that the primary device is now operating in "constant copy" mode (step 216) as described above in connection with FIG. 8. If the primary chain 56 does not include an instruction to suspend its own execution, the front-end detour 98 posts an error (step 218).

Referring back to FIG. 8, in some cases, the primary chain 56 may include neither read nor write instructions (step 170). When this is the case, the front-end detour 98 determines whether the primary chain 56 affects the status of the primary storage subsystem 26 (step 220). If the instructions have no such effect, the front-end detour 98 does nothing further (step 222). Otherwise, the front-end detour 98 creates a mirror chain 68 that causes the status of the mirror storage subsystem 30 to change in the same way. This mirror chain 68 is placed in the shadow queue for subsequent processing by the back-end detour 110 (step 224).

Referring back to FIG. 7, the front-end detour 98 verifies that the mirror chain 68 was correctly generated (step 226).

If an error occurred, the front-end detour 98 places the mirror I/O request on the shadow queue (step 228) and sets a CCW-error flag in a flag table associated with the shadow queue to indicate that a valid mirror chain 68 could not be generated (step 229). This CCW-error flag is checked later, as part of a post-status detour described in connection with FIG. 14. The front-end detour 98 then sets the return address to enable the back-end detour 110 to later intercept the return to the IOSVSCP module (step 108). After setting the return address, the front-end detour 98 yields control to the DDTSIO module (step 100).

Upon recognition of a correctly-generated mirror chain 68, then the front-end detour 98 determines whether the mirror chain 68 is to be handled (step 230). If not, then the front-end detour 98 sets the return address to enable the back-end pointer 110 to later intercept the return to the IOSVSSCH module (step 108). After setting the return address, the front-end detour 98 passes control to the DDTSIO module (step 100).

If the front-end detour 98 determines that the mirror chain 68 requires handling, it then determines whether the mirror chain 68 includes instructions to suspend itself (step 232). If so, then synchronous mirroring for the associated primary device 44 is disabled (step 234). The front-end detour 98 then sets the return address to enable the back-end detour 110 to later intercept the return to the IOSVSCP module (step 108). After setting the return address, the front-end detour 98 ends yields control to the DDTSIO module (step 100).

If the front-end detour 98 determines that the mirror chain 68 does not include instructions to suspend itself, it then creates a mirror I/O request and holds it in the shadow queue (step 236). It does so by creating a mirror IOSB 66 that points to the mirror chain 58 and placing the mirror IOSB 66 on the shadow queue. The mirror I/O request remains on the shadow queue until the back-end detour 110 receives a condition code from the primary SSCH command issued in connection with the primary I/O request.

Referring again to FIG. 5, if the target device is neither a primary device (step 114) nor a mirror device (step 116), the front-end detour 98 sets the second pointer to bypass the back-end detour 110 (step 106) and yields control to the DDTSIO module (step 100).

Soon after the front-end detour 98 yields control to the DDTSIO module, the IOSVSCP module issues the primary SSCH command to the primary subchannel 32 and provides the primary subchannel 32 with the physical address of the primary chain 56. The primary subchannel 32 then reaches into the main memory 14 to retrieve the primary chain 56 and to eventually provide the primary chain 56 to the primary storage subsystem 26 through the primary data link 24.

In some cases, the primary SSCH command fails to execute correctly. When this occurs, the IOSVSCP module returns a condition code indicating the failure of the SSCH command. This condition code is provided to either the IOSVSSCH module or to the back-end detour 110, depending on the value of the return address, as set during the front-end detour 98 (steps 106, 108). In particular, the condition code is returned either directly to the IOSVSCP module, as shown in FIG. 3, or it is provided to the back-end detour 110, as shown in FIG. 4.

Figure 12:
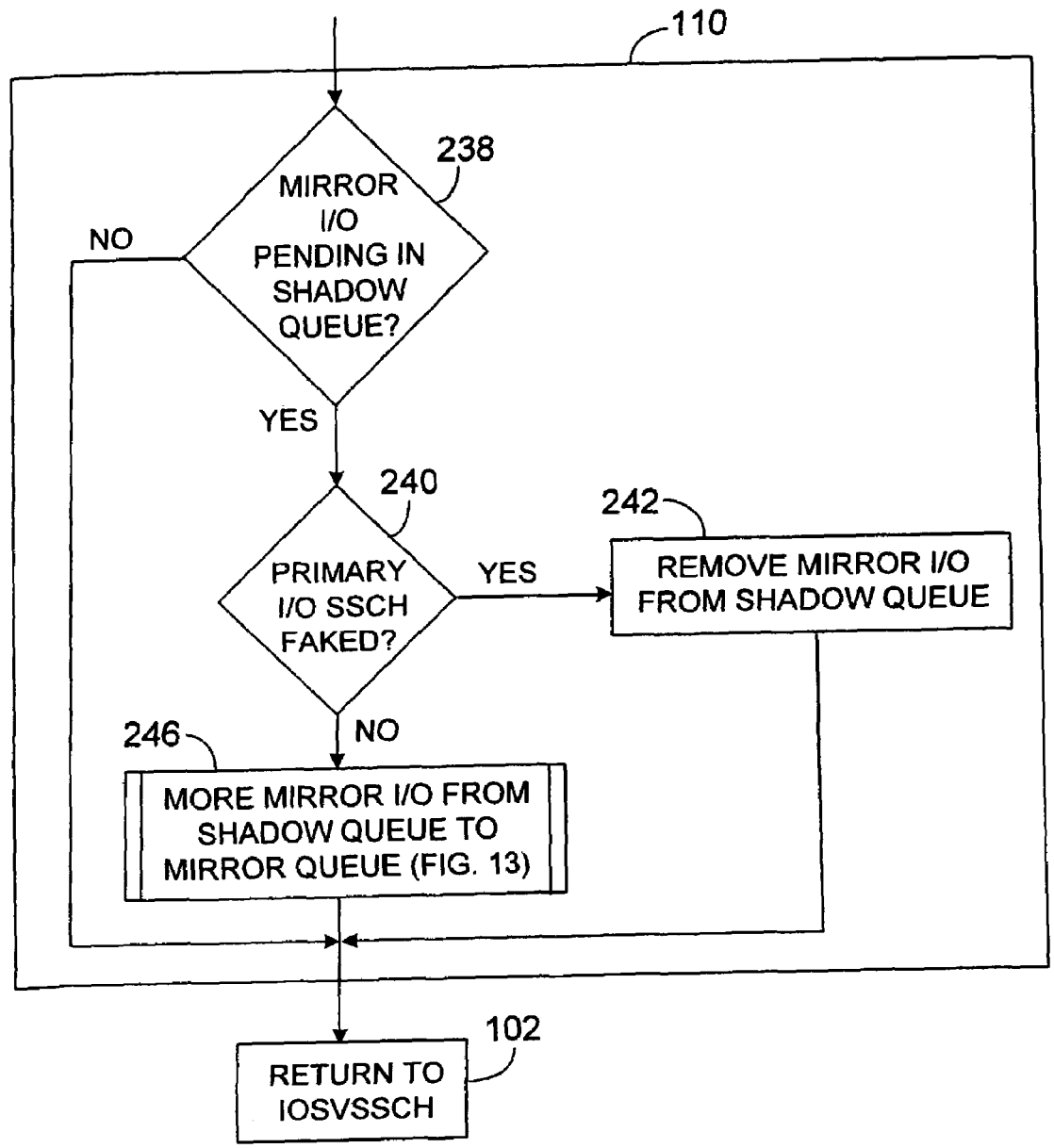
FIGS. 12–13 are flow-charts of the back-end detour shown in FIG. 4.

Referring to FIG. 12, the back-end detour 110 begins by determining whether or Not a mirror I/O request is pending on the shadow queue and if so, whether that mirror I/O request corresponds to the I/O request with which the completed SSCH command is associated (step 238). If no mirror I/O request is waiting, then the back-end detour 110 returns control the IOSVSSCH module.

If the back-end detour 110 determines that a corresponding mirror I/O request is waiting, it then determines whether the primary SSCH command failed or succeeded (step 240). A failed primary SSCH command causes the back-end detour 110 to remove the mirror I/O request from the shadow queue (step 242) before returning control to the IOSVSSCH module (step 102). A successful primary execution of the SSCH command, however, causes the back-end detour 110 to move the mirror I/O request from the shadow queue to the mirror queue 64 (step 246) and to return control to the IOSVSSCH module (step 102). The details of moving the mirror I/O request to the mirror queue 64 are discussed below in connection with FIG. 13.

Figure 13:
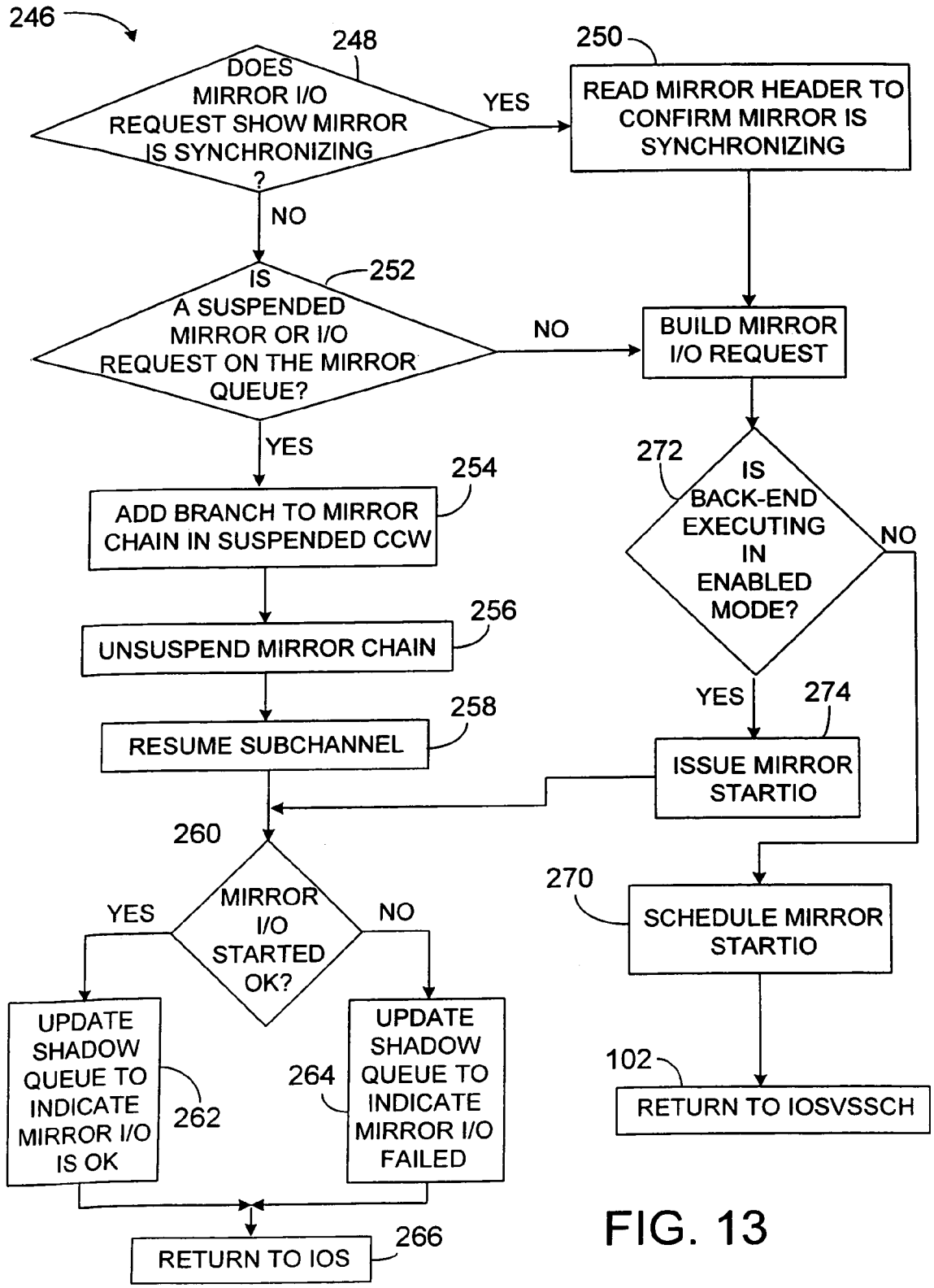

Referring now to FIG. 13, if the primary I/O request is issued as the mirror device 46 is being synchronized (see FIG. 2), it is unnecessary to schedule a corresponding mirror I/O. The process of synchronization will itself migrate such data to the mirror device.

The mirror I/O request, and in particular, the mirror IOSB 66, contains information indicating whether or not the mirror device 46 is, as of the time the mirror I/O request was created, in the midst of synchronizing. Referring now to FIG. 13, the back-end detour 110 thus begins by inspecting the mirror IOSB 66 to determine whether the mirror device 46 is synchronizing (step 248).

While a mirror device 46 is synchronizing, the primary I/O request may be queued after the brief suspension of I/O (step 82 in FIG. 2) that precedes the final copying step. If so, the mirror IOSB 66 created during the front-end detour 98 would then indicate that the mirror device 46 is synchronizing and that therefore, no mirroring is required. However, when I/O is later resumed (step 86), and the queued primary I/O request is actually consummated, the mirror device 46 will no longer be synchronizing. As a result, the primary I/O request will not be mirrored.

To avoid this, the back-end detour 110, upon discovering that the mirror device 46 is synchronizing, creates an I/O request that includes a read chain, the function of which is to read a header of the mirror device 46 and to determine, on the basis of information in that header, whether the mirror device 46 continues to be synchronizing (step 250).

The read chain reads a mirror write status area for the mirror device's VOL1 label (record 3). The 80-byte VOL1 label includes reserved areas that are available for indicating whether the mirror device is synchronizing or not. In particular, the 28 byte area following AVOLOWNR is used to indicate the synchronization status of the mirror device.

If a mirror I/O request having a suspended mirror chain 68 is already on the mirror queue 64 (step 252), there is no need for the back-end detour 110 to incur the additional overhead associated with queuing another mirror I/O request pointing to yet another mirror chain 68. Instead, the back-end detour 110 updates the suspended mirror chain 68 by inserting a TIC ("Transfer In Channel") in whichever channel control word in that chain is suspended (step 254). This TIC points to the mirror chain 68 that has just been created by the front-end detour 98. The back-end detour 110 then clears the suspend bit (step 256) of the suspended channel control word, and issues a resume subchannel command by calling the IOSVRSUM module (step 258). The TIC causes the suspended mirror chain 68 to branch to, and execute, the mirror chain 68 created by the front-end detour 98, thereby enabling that mirror-chain 68 to be passed to the mirror device 46 without having to queue another I/O request.

The back-end detour 110 then confirms that the mirror I/O issued successfully (step 260). Depending on the outcome, the back-end detour 110 updates the shadow queue to indicate that the mirror I/O request has begun (step 262) or failed (step 264). Then, the back-end detour 110 returns control to the IOSVSSCH module (step 266), as shown in FIG. 4.

Referring again to FIG. 13, if no suspended mirror channel program is on the mirror unit control block 42 (step 252), the back-end detour 110 performs, for the mirror I/O request, essentially the same tasks that the access method 52 performed for the primary I/O request. In particular, the back-end detour 110 associates the mirror IOSB 66 with the mirror chain 68 (step 268).

A processor 12 can execute a sequence of instructions in either "disabled mode" or "enabled mode." When instructions are executed in enabled mode, they may be interrupted for any of a variety of reasons. In most cases, the processor 12 executes instructions in enabled mode.

Certain critical tasks, however, are best completed without interruption. Instructions for performing these tasks are executed in disabled mode to prevent the processor 12 from responding to interrupts. Among these critical tasks is the queuing of an I/O request. As a result, between issuance of a primary STARTIO and the completed queuing of the primary I/O request, the processor 12 executes instructions in disabled mode. Referring back to FIG. 4, it is apparent that the back-end detour 110 executes in precisely this interval. Therefore, the back-end detour 110 executes in disabled mode.

Unlike the access method 52, therefore, the back-end detour 110 cannot simply issue a mirror STARTIO for the mirror I/O request. This is because, as noted above, the back-end detour 110, when called following a primary STARTIO, executes in disabled mode.

To circumvent this difficulty, the back-end detour 110 schedules itself to be executed again later (step 270), this time in enabled mode, either by the same processor 12 or by another processor. It does so by placing instructions to execute itself into a high priority dispatch queue maintained by the operating system. Once the scheduled back-end detour 110 reaches the top of the dispatch queue, a dispatcher causes it to be executed, this time in enabled mode. As a result, the back-end detour 110, when launched from the dispatch queue, will be able to issue a mirror STARTIO for the mirror I/O request.

To avoid postponing the mirror STARTIO indefinitely, the back-end detour 110, includes a check for determining whether it is, in fact, executing in disabled mode (step 272). If it finds itself executing in disabled mode, the back-end detour 110 schedules itself to be executed later (step 270), as discussed above, and returns control to the IOSVSSCH module (step 102). If, on the other hand, the back-end detour 110 finds itself executing in enabled mode, as would be the case if it were launched from the dispatch queue, it issues a mirror STARTIO (step 274), thereby moving the mirror I/O request from the shadow queue to the mirror queue 64. The back-end detour 110 then confirms that the mirror STARTIO issued successfully (step 260). Depending on the outcome, the back-end detour 110 updates the shadow queue to indicate that the mirror I/O request has begun (step 262) or that it has failed (step 264). Then, the back-end detour 110 ends (step 266).

When launched from the dispatch queue, the back-end detour 110 is not a "detour" in the sense that it represents a change in a conventional control flow as shown in FIG. 4. Hence, as used herein, "back-end detour" refers to the instructions for executing the steps shown in FIG. 13, independent of where in the flow of control those instructions are executed.

Assuming that the front and back end detours 98, 110 have completed successfully, the primary and mirror chains 56, 68 will have been sent to the respective primary and mirror storage subsystems 26, 30. Because the primary device 44 is mirrored, it is only when both the mirror device 46 and the primary device 44 have completed their respective write operations that an application 54 writing to the primary device 44 receives a completion message indicating successful completion of the primary I/O request.

Figure 14:
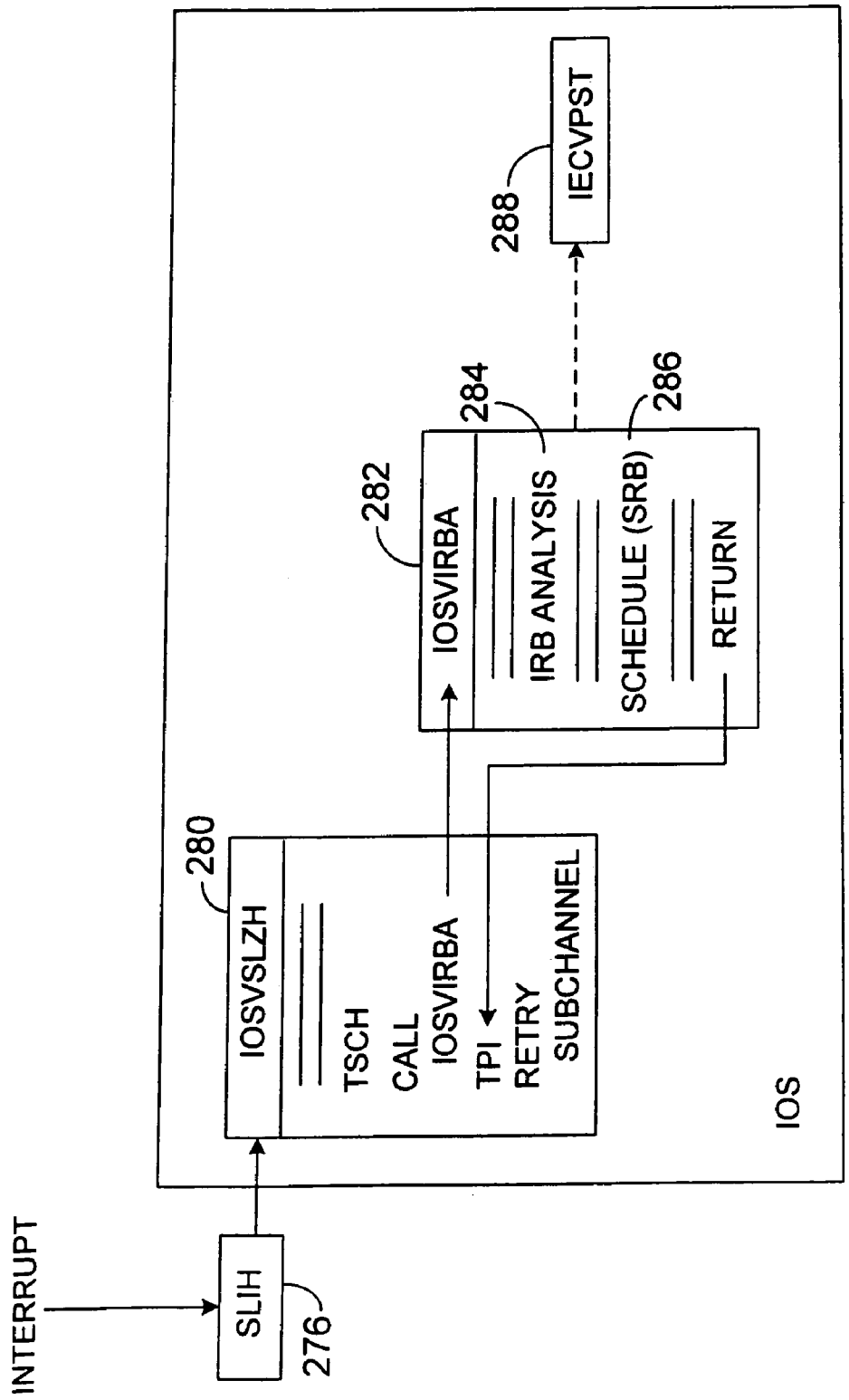

Once either storage subsystem 26, 30 has completed processing an I/O request, it sends a status message back to the corresponding sub-channel 32, 34. This status message causes the corresponding sub-channel 32, 34 to send an interrupt to the operating system. Referring now to FIG. 14, a second level interrupt handler ("SLIH") provided by the operating system processes this interrupt (step 276) by executing the TSCH ("Test SubChannel") routine from the IOSVSLIH module 280. The TSCH routine obtains an interrupt response block ("IRB") that includes a sub-channel status word indicating whether the storage system 26, 30 successfully completed the I/O request (step 278).

The SLIH then calls either user-supplied or built-in routines that are pointed to by either the primary IOSB 58, if the I/O request was a primary I/O request, or by the mirror IOSB 66, if the I/O request was a mirror I/O request. These routines analyze the interrupt response block and perform specified functions on the basis of the contents thereof (step 284).

For a primary I/O request, the analysis of the IRB proceeds in a conventional manner. In the case of a mirror I/O request however, the mirror IOSB 66 points to a routine for setting a mirror-completion flag in the flag table. This mirror-completion flag indicates whether the mirror I/O request has been completed, and if so, whether it completed successfully. The mirror-completion flag is inspected later to determine whether or not to send a completion message to the access method 52.

Upon completion of the IRB analysis, a service request block ("SRB") is scheduled for execution on the dispatch queue maintained by the operating system (step 286). The SRB includes a third pointer to an entry point SRBEP that points to instructions to be carried out when the SRB reaches the top of the dispatch queue. In a conventional system, the SRBEP points to the IOS supplied post-status routine IECVPST 288, the function of which is to re-drive the I/O request if appropriate, or to send a message to the access method 52 reporting the I/O request as having been completed or having failed.

Figure 15:
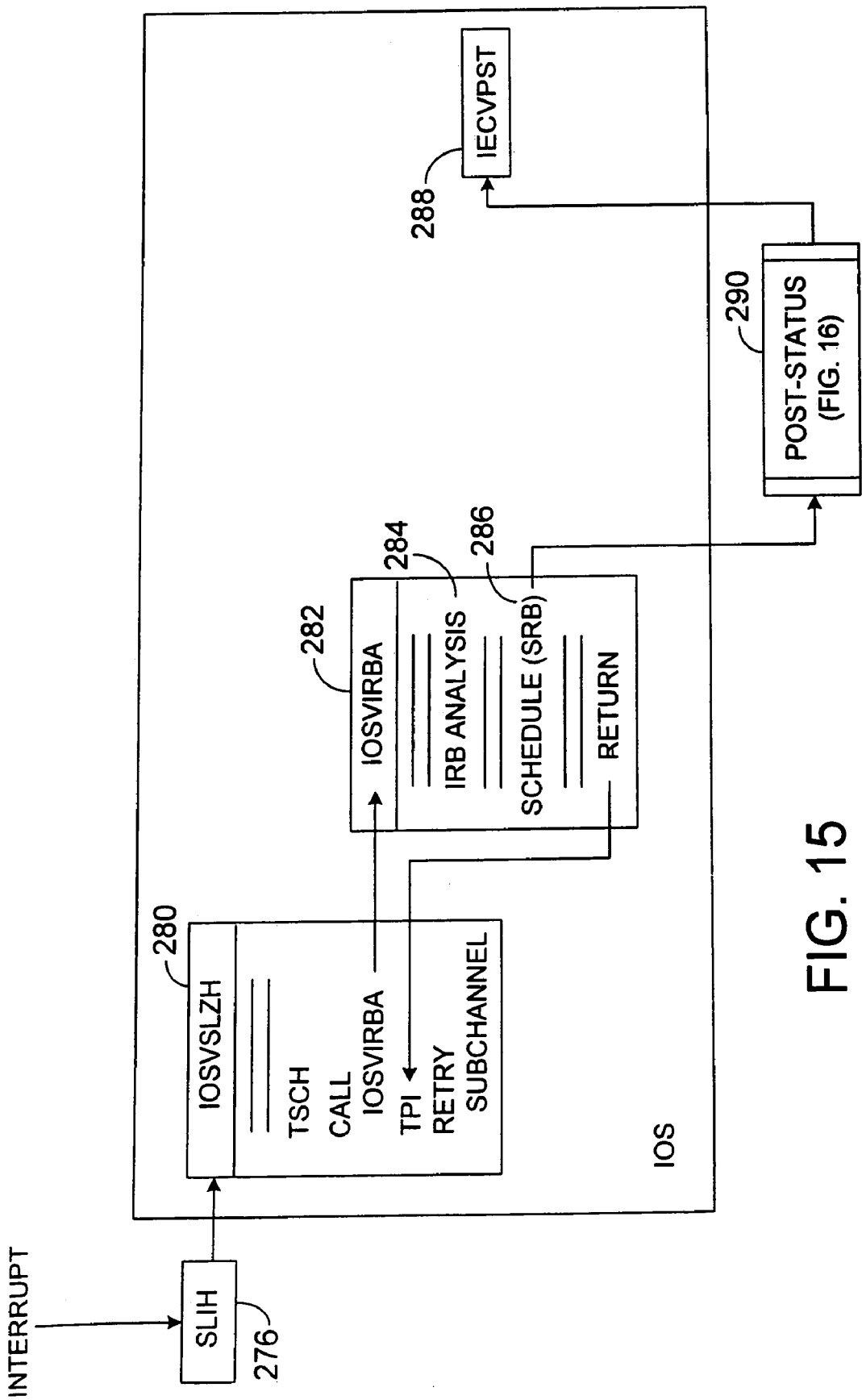

In the course of initializing the system, the third pointer, which would ordinarily point to the IECVPST module 288, is made to point to a portion of the intercept process 50 referred to herein as the "post-status detour" 290, the purpose of which is to ensure that the access method 52 receives a completion message only when both the primary I/O request and the mirror I/O request have completed successfully. Consequently, when the SRB reaches the top of the dispatch queue, the IOS executes instructions from the post-status detour 290, as shown in FIG. 15, instead of instructions from the IECVPST module 288, as shown in FIG. 14. The post-status detour 290 ends with an instruction to yield control to the IECVPST module 288, thereby enabling the IOS to proceed in the conventional manner.

Figure 16:
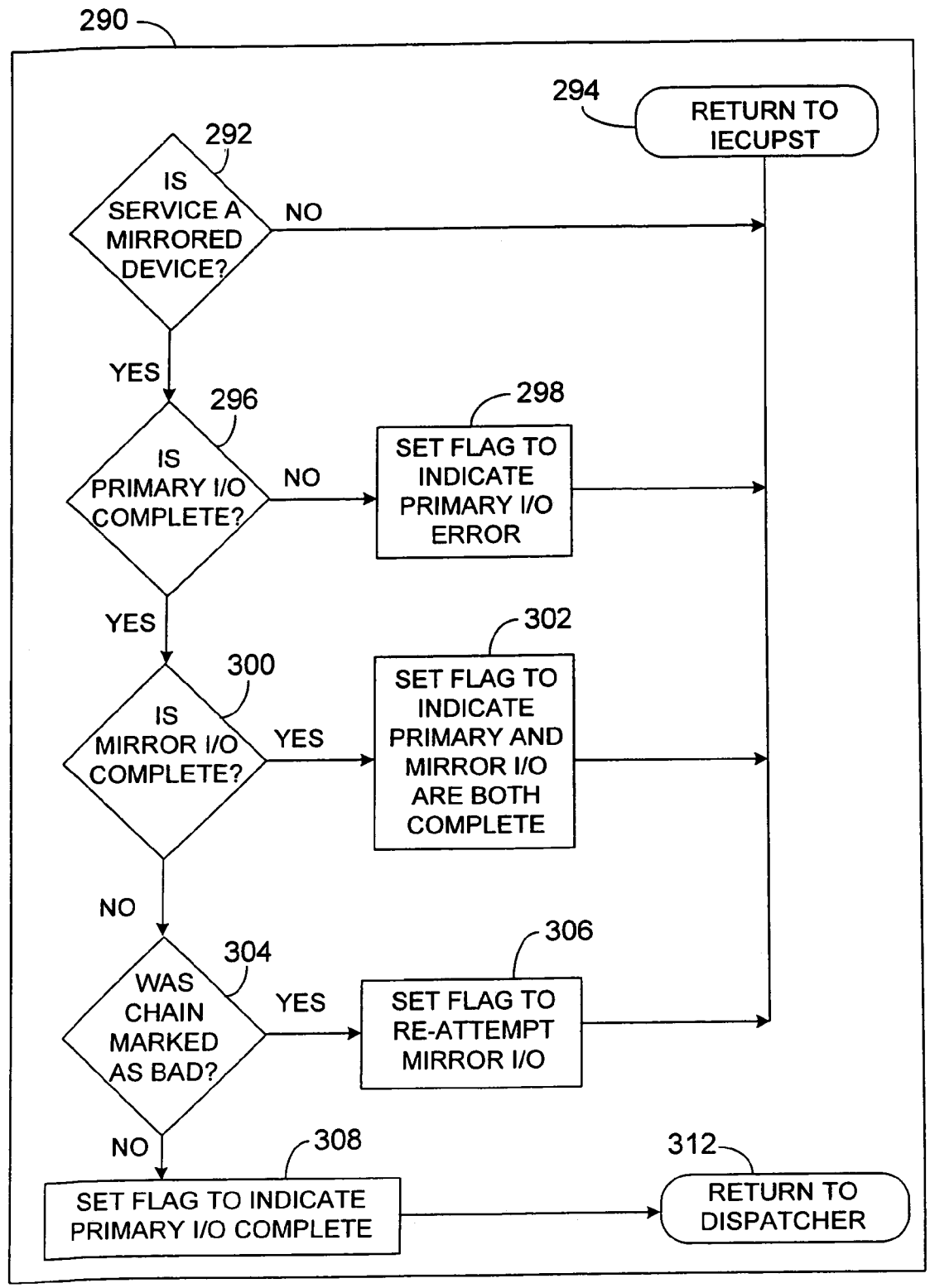
FIG. 16 is a flow-chart of the post-status detour shown in FIG. 15.

Referring to FIG. 16, the post-status detour 290 determines whether the I/O request has, as its target device, a device other than a primary device (step 292). As noted above, when an I/O request is a mirror I/O request, the mirror IOSB 66, which is processed during the IRB analysis, causes a mirror-completion flag to be set (step 284 in FIG. 15). Hence, information about the status of the mirror I/O is already available before the post-status detour 290 is executed. When the I/O request is one to an unmirrored device, there is no mirror I/O request, and hence no need to delay a completion message. In either case, the post-status detour 290 yields control to the IECVPST module (step 294).

If the I/O request is a primary I/O request, then the post-status detour 290 determines, using information in the interrupt response block, whether the primary I/O request completed successfully (step 296). A failed primary I/O request causes the post-status detour 290 to set a primary I/O error flag in the flag table (step 298) and to return control to the IECVPST module (step 294). The IECVPST module 288 will then either re-drive the primary I/O or send a message to the access method 52 reporting that the primary I/O request has failed.

In some embodiments, the post-status detour 290 responds to failure of a primary I/O request by causing what was formerly the mirror device 46 to become a new, unmirrored primary device 44. In some cases, where the primary device 44 has more than one mirror device 46, a failed primary I/O request causes the post-status detour to designate one of those mirror devices 46 to be the new primary device 44. Like the original primary device, this new primary device would also be a mirrored device, albeit with one less mirror.

If the primary I/O request completed successfully, the post-status detour 290 next inspects the mirror-completion flag in the flag table to determine whether the mirror I/O also completed successfully (step 300).

If the mirror I/O request completed successfully, the post-status detour 290 sets a mirror I/O-completion flag in the flag table to indicate that both the primary and the mirror I/O requests have been successfully completed (step 302). The post-status detour 290 then returns control to the IECVPST module (step 294), which will report completion of the primary I/O request to the access method 52.

If the mirror I/O request did not complete successfully, the post-status detour 290 checks the CCW-error flag to determine whether a valid chain was generated by the front-end detour 98 (step 304). If no valid chain was generated, the shadow queue is updated to re-attempt the mirror I/O (step 306). Alternatively, the mirror device 46 that was the target of the failed I/O request is disassociated from the primary device 44, thereby disabling synchronous mirroring for the primay device 44. In some embodiments, where the primary device 44 has more than one mirror device 46, only one of which was the target of a failed mirror I/O request, all the mirror devices are disassociated from the primary device 44. In other embodiments, an application 54 stores data across many primary devices, each of which has one or more associated mirror devices. In this case, all mirror devices are disassociated from their respective primary devices. These measures assure consistency between the data in all the mirror devices.

If the CCW-error flag indicates that a valid chain was generated, it can only mean that the mirror I/O request has not yet completed on the mirror device 46. In this case, the post-status detour 290 sets a mirror-incomplete flag in the flag table to indicate that the mirror I/O request has not yet completed (step 308). The post-status detour 290 does not, however, yield control to the IECVPST module, since to do so would result in the access method 52 receiving a completion message even though the mirror I/O request has not yet completed. Instead, the post-status detour 290 yields control to the dispatcher (step 312). Only later, if and when the mirror I/O request completes, does the IECVPST module finally process the primary I/O request. The mechanism by which this occurs is triggered by the completion of the mirror I/O request.

In particular, upon recognizing the completion of the mirror I/O request, the mirror process 48 inspects a primary completion flag associated with the primary I/O request to determine whether the primary I/O request corresponding to that mirror I/O request has also completed. If it has, then the mirror process 48 schedules the post-status detour 290 to operate on the primary I/O request. This causes the procedure set forth in FIG. 16 to again operate on the primary I/O request. However, this time, the primary I/O request is complete (step 296). Since the mirror I/O request is likewise complete (step 300), the post-status detour 290 sets a flag indicating completion of both I/O requests (step 302) and returns control to the IECVPST module (step 294). The IECVPST module, which of course knows nothing of the mirror I/O request, nevertheless recognizes the completion of the primary I/O request. Accordingly, the IECVPST module sends a message to the access method 52 reporting that the primary I/O request has completed.

If the mirror device 46 is unavailable, the post-status detour 290 will never be re-scheduled. This would cause the application to wait indefintely. To avoid such a mishap, a monitor process periodically inspects the dispatch queue and posts an error when this occurs.

As noted above, the mirror data link 28 connects the host computer 10 to the mirror storage subsystem 30. The mirror storage subsystem 30 is preferably located far enough away from the primary storage subsystem 26 to reduce the likelihood that the mirror and primary storage subsystems 26, 30 will be destroyed by the same catastrophic event. However, in other cases, mirroring is intended to only guard against disk failures, in which case the primary and mirror subsystems 26, 30 can be located near each other, or can be the same storage subsystem.

Since I/O requests queued by the primary and mirror unit control blocks 28, 34 are independent of each other, any primary I/O request can be carried out in parallel with one or more mirror I/O requests. As a result, the host computer 10 performs its own mirroring operations in parallel.

The host computer 10 can be a mainframe computer, such as those manufactured by IBM Corporation of Poughkeepsie, N.Y. and Amdahl Corporation of Sunnyvale, Calif. Such mainframe computers are often under control of an MVS ("Multiple Virtual Storage") operating system such as OS/390 or z/OS. Alternatively, the host computer 10 can an open system computer under control of an operating system such as UNIX, or Windows NT. One or both of the primary or mirror storage subsystems 26, 30 can be a Symmetrix system manufactured by EMC Corporation of Hopkinton, Mass. In either case, the subject matter of the invention depends on neither the type of host computer 10 nor the type of storage subsystem 26, 30.

The data link 17, 29 between the host computer 10 and either the primary or mirror storage subsystems 26, 30 can be an ESCON ("Enterprise Systems CONnection") link when the distance to be traversed is short enough to avoid data drooping. However, for longer distances, the preferred data link is a FICON ("FIber CONnection") link. In either case, the subject matter of the invention does not depend on the type of data link that exists between the host computer 10 and either storage subsystem 26, 30. In addition, the mirroring method described herein can be used to mirror local devices.

The system described herein has a single mirror storage subsystem 30. However, there is no such limitation on the scope of the invention. Additional mirror storage subsystems can be included by providing additional subchannels and additional unit control blocks. The intercept process 50 then carries out the method above and queues the resulting chain for transmission to each of the mirror storage subsystems.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Having described the invention, and a preferred embodiment thereof, what is claimed as new and secured by Letters Patent is:

1. A data-mirroring method comprising:
    obtaining control from an I/O process executing on a host computer, the I/O process processing a first I/O request for writing data to a first device, wherein obtaining control from an I/O process comprises intercepting a call by a first module to a second module;
    creating a second I/O request for writing the data to a second device; and
    returning control to the I/O process.
2. The method of claim 1, further comprising determining that the first device is being mirrored by a second device.
3. The method of claim 1, wherein obtaining control from an I/O process comprises:
    identifying a forward pointer to instructions to be executed by the I/O process in processing the first I/O request; and
    causing the forward pointer to point to a front-end detour that includes instructions for creating the second I/O request.
4. The method of claim 1, further comprising selecting the first module to be an IOSVSSCH module and selecting the second module to be a DDTSIO module.
5. The method of claim 1, wherein obtaining control from an I/O process comprises:
    identifying a forward pointer that points to instructions for executing the second module, and
    causing the forward pointer to point to instructions for executing a front-end detour, the front-end detour including instructions for creating the second I/O request.
6. The method of claim 1, further comprising:
    obtaining control from the I/O process after the first I/O request has been made available to a first data storage system managing the first device; and
    obtaining information indicative of a status of the first I/O request.
7. The method of claim 1, further comprising:
    identifying a return pointer to a module that is intended to receive information indicative of a status of the first I/O request; and
    causing the return pointer to point to a back-end detour, the back-end detour including instructions for causing the second I/O request to be provided to a second data storage system managing the second device.
8. The method of claim 7, wherein identifying a return pointer comprises identifying a pointer to the first module.

9. A computer-readable medium having encoded thereon software for executing a data-mirroring method, said software comprising instructions for:
    obtaining control from an I/O process executing on a host computer, the I/O process processing a first I/O request for writing data to a first device wherein the instructions for obtaining control from the I/O process comprise instructions for intercepting a call by a first module to a second module;
    creating a second I/O request for writing the data to a second device; and
    returning control to the I/O process.
10. The computer-readable medium of claim 9, wherein the software further comprises instructions for determining that the first device is being mirrored by a second device.
11. The computer-readable medium of claim 9, wherein the instructions for obtaining control from an I/O process comprise instructions for:
    identifying a forward pointer to instructions to be executed by the I/O process in processing the first I/O request; and
    causing the forward pointer to point to a front-end detour that includes instructions for creating the second I/O request.
12. The computer-readable medium of claim 9, wherein the instructions for obtaining control from an I/O process comprise instructions for the first module to be an IOSVSSCH module and selecting the second module to be a DDTSIO module.
13. The computer-readable medium of claim 9, wherein the instructions for obtaining control from an I/O process comprise instructions for:
    identifying a forward pointer that points to instructions for executing the first module, and
    causing the forward pointer to point to instructions for executing a front-end detour, the front-end detour including instructions for creating the second I/O request.
14. The computer-readable medium of claim 9, wherein the software further comprises instructions for instructions for:
    obtaining control from the I/O process after the first I/O request has been made available to a first data storage system managing the first device; and
    obtaining information indicative of a status of the first I/O request.
15. The computer-readable medium of claim 9, wherein the software further comprises instructions for:
    identifying a return pointer to a module that is intended to receive information indicative of a status of the first I/O request; and
    causing the return pointer to point to a back-end detour, the back-end detour including instructions for causing the second I/O request to be provided to a second data storage system managing the second device.
16. The computer-readable medium of claim 15, wherein the instructions for identifying a return pointer comprise instructions for identifying a pointer to the first module.
17. A data-mirroring method comprising:
    obtaining control from an I/O process executing on a host computer, the I/O process processing a first I/O request for writing data to a first device;
    creating a second I/O request for writing the data to the second device; and
    returning control to the I/O process;

wherein obtaining control from an I/O process comprises:
identifying a forward pointer to instructions to be executed by the I/O process in processing the first I/O request; and
causing the forward pointer to point to a front-end detour that includes instructions for creating the second I/O request.

18. A computer-readable medium having encoded thereon software for executing a data-mirroring method, said software comprising instructions for:
obtaining control from an I/O process executing on a host computer, the I/O process processing a first I/O request for writing data to a first device;
creating a second I/O request for writing the data to the second device; and
returning control to the I/O process;
wherein, the instructions for obtaining control from an I/O process comprise instructions for:
identifying a forward pointer to instructions to be executed by the I/O process in processing the first I/O request; and
causing the forward pointer to point to a front-end detour that includes instructions for creating the second I/O request.

* * * * *